(12) United States Patent
Kastl et al.

(10) Patent No.: US 6,402,469 B1
(45) Date of Patent: Jun. 11, 2002

(54) FAN DECOUPLING FUSE

(75) Inventors: John Andrew Kastl, Wahoo, NE (US); Randy Marinus Vondrell, Sharonville; Christopher Charles Glynn, Hamilton, both of OH (US)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 09/692,947

(22) Filed: Oct. 20, 2000

(51) Int. Cl.[7] ................................................ F01D 5/00
(52) U.S. Cl. ............................................... 416/2; 415/9
(58) Field of Search ...................... 415/9, 229; 416/2; 60/223, 226.1, 39.091

(56) References Cited

U.S. PATENT DOCUMENTS

| | | | |
|---|---|---|---|
| 4,313,712 A | * | 2/1982 | Briggs ........................... 416/2 |
| 5,417,501 A | | 5/1995 | Hyde et al. |
| 5,733,050 A | | 3/1998 | Diepolder et al. |
| 6,073,439 A | * | 6/2000 | Beaven et al. ................ 20/223 |
| 6,109,022 A | * | 6/2000 | Allen et al. ................... 60/223 |
| 6,082,959 A | * | 7/2000 | Van Duyn ...................... 415/9 |

OTHER PUBLICATIONS

GE Aircraft Engines, "CF6 Turbofan Engine, Forward Bearing Housing," in commercial use in U.S. for more than one year.

* cited by examiner

Primary Examiner—Edward K. Look
Assistant Examiner—Ninh Nguyen
(74) Attorney, Agent, or Firm—Nathan D. Herkamp; Francis L. Conte

(57) ABSTRACT

A fan decoupling fuse includes a ring having a row of fuse holes circumferentially spaced apart from each other by fuse ligaments sized to fail under shear when carrying abnormal radial loads from the fan.

20 Claims, 3 Drawing Sheets

FAN DECOUPLING FUSE

BACKGROUND OF THE INVENTION

The present invention relates generally to gas turbine engines, and, more specifically, to turbofan engines.

A turbofan gas turbine engine includes a fan for pressurizing ambient air to produce propulsion thrust for powering an aircraft in flight, with the fan being powered by a core engine. Disposed downstream from the fan is a multi-stage axial compressor that pressurizes a portion of the fan air which is then mixed with fuel in a combustor for generating hot combustion gases which flow downstream through turbine stages that extract energy therefrom. A high pressure turbine powers the compressor by rotating a shaft therebetween. And, a low pressure turbine powers the fan by rotating a fan shaft therebetween.

The fan shaft is supported in a bearing near the fan with the bearing in turn being supported by a bearing support fixedly joined to a stationary fan frame. During normal operation, the fan rotates dynamically balanced, and the fan bearing maintains concentric alignment of the fan within a surrounding fan casing, and carries operational loads into the fan frame.

The fan includes a row of large rotor fan blades extending radially outwardly from a supporting rotor disk, and is subject to foreign object damage (FOD). For example, a large bird may be ingested by the engine and strike one or more of the fan blades causing substantial damage thereto including liberation thereof from the supporting fan disk. Accordingly, a substantial rotary imbalance load will be created in the damaged fan, which imbalance load must be suitably carried by the fan bearing, its support, and fan frame.

In order to accommodate the possibility of such a large abnormal imbalance load, the various supporting components for the fan may be sized for additional strength required therefor. However, the stronger supporting components undesirably increase weight of the engine and decrease overall efficiency of the engine when used in normal operation without substantial rotor imbalance.

Another solution for large imbalance loads is the introduction of a bearing support which intentionally severs in the imbalance event for decoupling the fan from the bearing support. In this event, the fan is supported by its relatively flexible fan shaft which reduces the fan critical speed well below the maximum operating speed thereof. The fan accordingly operates dynamically supercritical for significantly reducing orbit of the fan disk and imbalance loads therefrom. The fan speed is then reduced and crosses the fan critical speed at a relatively low value with rapid deceleration having correspondingly reduced peak loads therefrom.

The stiffened bearing support configuration is sufficiently strong to prevent any structural failure thereof. However, by softening the structural loadpath to introduce intentional failure for abnormal fan loads, the loadpath components are subject to undesirable fatigue damage which could adversely reduce the life thereof.

The ability to introduce the decoupling bearing support is limited by the particular bearing support design and available space. Since the bearing support is located radially inwardly of the fan blades, little available space is provided for introducing decoupling features without undesirably increasing the overall diameter of the fan. And, the decoupling configuration should have minimal variability between the maximum load capability thereof prior to the decoupling failure and the minimum load capability for normal operation without accumulating life-limiting fatigue damage.

Accordingly, it is desired to provide an improved fan decoupling system with minimal variability between maximum load capability and minimum load capability without life-limiting fatigue damage.

BRIEF SUMMARY OF THE INVENTION

A fan decoupling fuse includes a ring having a row of fuse holes circumferentially spaced apart from each other by fuse ligaments sized to fail under shear when carrying abnormal radial loads from the fan.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
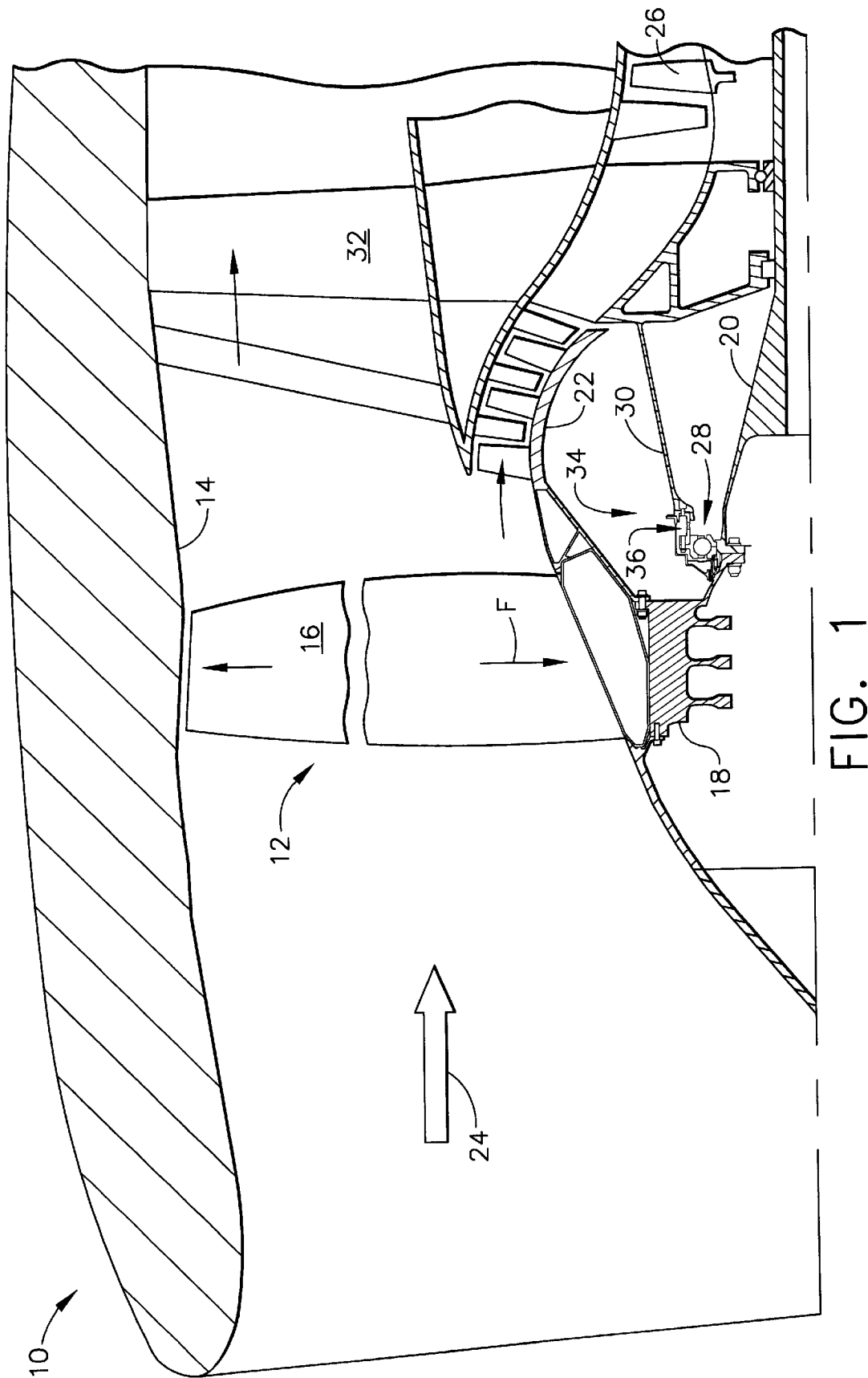
FIG. 1 is a partly sectional, elevational view of the fan section of a turbofan gas turbine engine in accordance with an exemplary embodiment of the present invention.

Illustrated in FIG. 1 is the front portion of a turbofan gas turbine engine 10 configured for powering an aircraft in flight. The engine is axisymmetrical about a longitudinal or axial centerline axis and includes a fan 12 mounted concentrically inside a surrounding fan casing 14.

The fan 12 includes a row of relatively large rotor fan blades 16 extending radially outwardly from a supporting rotor disk 18. The disk in turn is suitably joined to a fan shaft 20.

In the exemplary embodiment illustrated in FIG. 1, a low pressure or booster compressor 22 is disposed downstream from the fan and is commonly joined to the fan shaft for initially pressurizing a lower portion of ambient air 24. The fan itself pressurizes the air during operation, the outer portion of which is discharged from the engine for producing propulsion thrust.

The inner portion of the air from the fan is channeled through the booster compressor and in turn to a multi-stage axial compressor 26, shown in forward part, which further compresses the air which is then mixed with fuel and ignited in a combustor (not shown) for generating hot combustion gases which flow downstream through turbine stages (not shown) which extract energy therefrom for powering both the fan and compressor during operation.

The compressor 26 is powered by a high pressure turbine (not shown) by rotating a corresponding shaft therebetween.

And, a low pressure turbine (not shown) powers the fan 12 by rotating the fan shaft 20 therebetween.

The fan 12 is rotatably supported during operation by a conventional fan or forward bearing 28, which may have any conventional form and typically surrounds the junction of the fan disk 18 and the fan shaft 20. The bearing 28 in turn is supported by a bearing support 30 which in turn is fixedly joined to an annular fan frame 32 disposed downstream therefrom. The fan frame includes a plurality of radial struts which support the fan casing and nacelle at the outer ends thereof. The inner ends of the fan struts are joined to a common hub which additionally supports the fan shaft at additional bearings in a conventional manner.

During normal operation, the fan rotates dynamically balanced and is driven by the fan shaft 20 at suitable operating speed for pressurizing the ambient air 24 and producing propulsion thrust. The various aerodynamic, centrifugal, and vibratory loads experienced by the fan are carried through the forward bearing 28 into the fan frame 32. The bearing support 30 and fan frame 32 are suitably sized for carrying these normal operational loads without accumulating life-limiting fatigue damage.

However, in the event of FOD for example, which may occur due to a large bird striking one of the fan blades 16, a part or all of one fan blade may be broken, as shown in FIG. 1, and correspondingly liberated into the surrounding fan casing wherein it is suitably contained. The liberated fan blade portion is ejected radially outwardly due to centrifugal force, with the fan then becoming unbalanced with a resulting radial imbalance force or load F directed in the radially inwardly, opposite direction. The imbalance force must be suitably accommodated for preventing secondary damage to other components of the engine during the time it takes to shut down operation of the damaged engine.

In accordance with the present invention, a fan decoupler system 34 is introduced in the fan for automatically decoupling the fan 12 from its bearing support during abnormal rotor imbalance such as that due to a large bird strike or fan bladeout event in which a substantially large fan imbalance load F is generated.

The damaged fan 12 itself introduces the radial imbalance force F in the event of abnormal operation, which imbalance force rotates about the engine centerline axis as the engine is shut down. Accordingly, the unbalanced fan 12 remains attached to the fan shaft 20 and carries the imbalance loads thereto.

The imbalance loads are in turn carried to the fan bearing 28 which rotatably supports the forward end of the fan shaft 20.

And, a fan decoupling fuse 36 In accordance with the present invention is introduced for supporting the bearing 28 to the bearing support 30 which are fixedly interjoined together in turn for carrying normal bearing loads to the fan frame 32.

Figure 2:
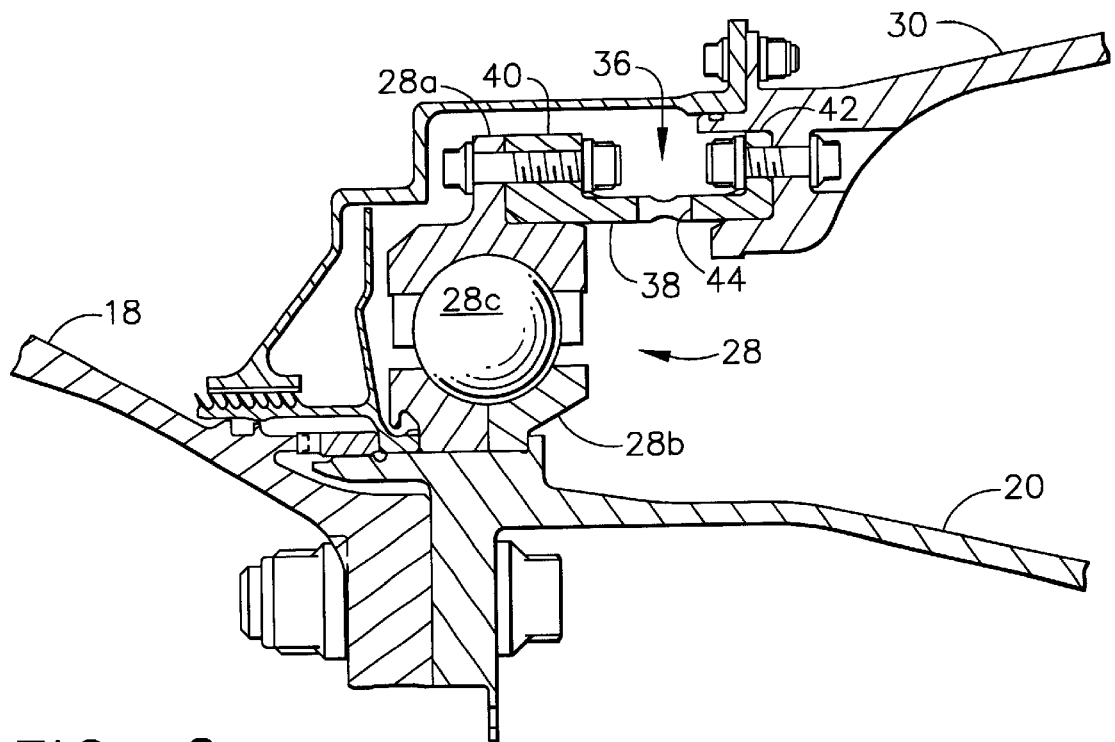
FIG. 2 is an enlarged, elevational sectional view of the fan bearing illustrated in FIG. 1 supported by a fan decoupling fuse in accordance with an exemplary embodiment of the present invention.
Figure 3:
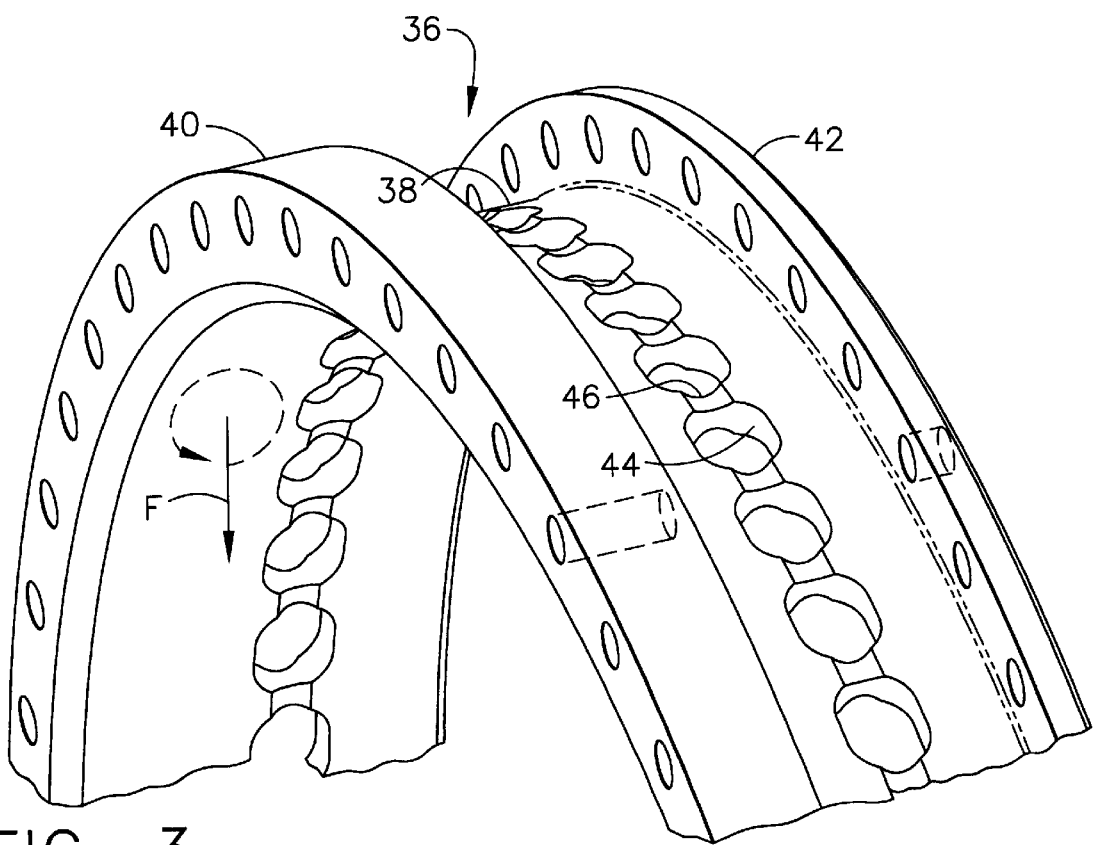
FIG. 3 is an isometric view of a portion of the annular fuse illustrated in FIG. 2 in isolation.

The fan decoupling fuse 36 is illustrated in combination in a preferred embodiment in FIG. 2, and in part in isolation in FIG. 3. The fan decoupling fuse is specifically configured for carrying normal operational loads from the fan through the forward bearing 28 into the bearing support 30 and then into the fan frame. Yet, during abnormal operation of the fan in which an abnormal fan imbalance load F of predetermined value is generated, the fuse 36 will sever for decoupling the fan and its bearing 28 from the bearing support 30 and thus permit unrestrained rotation of the fan with the remaining support provided by the fan shaft 20.

In this way, the fan critical speed will drop well below the maximum operating speed of the fan for substantially reducing orbit of the fan and rotor shaft, and radial loads generated therefrom during the abnormal operation. The affected engine will be shut down and the fan speed will decrease with relatively rapid deceleration crossing the lower fan critical speed with reduced peak loads.

As shown in FIGS. 2 and 3, the fuse 36 includes a center ring 38 integrally joined with an annular forward radial flange 40 at the forward end thereof and an integral annular aft radial flange 42 at an aft end thereof, preferably in a one-piece or unitary configuration. As shown in FIG. 2, the bearing 28 may have any conventional form and includes an annular outer race 28*a*, an annular inner race 28*b*, and suitable bearing elements 28*c* therebetween. The inner race is suitably mounted at the juncture of a mounting flange for the rotor disk 18 and the fan shaft 20. And, the outer race 28*a* includes a seat in which the fuse forward flange 40 is fixedly mounted by a row of axial fasteners in the form of bolts and cooperating nuts.

Similarly, the fuse aft flange 42 is fixedly mounted in a complementary seat formed in the forward end of the bearing support 30 and fixedly joined thereto by a row of additional fasteners in the form of bolts and cooperating nuts. In this way, a direct loadpath is defined from the fan disk 18 and shaft 20 radially outwardly through the bearing 28 and through the fuse 38 for carrying all normal loads during operation to the bearing support 30 and in turn to the fan frame.

Figure 4:
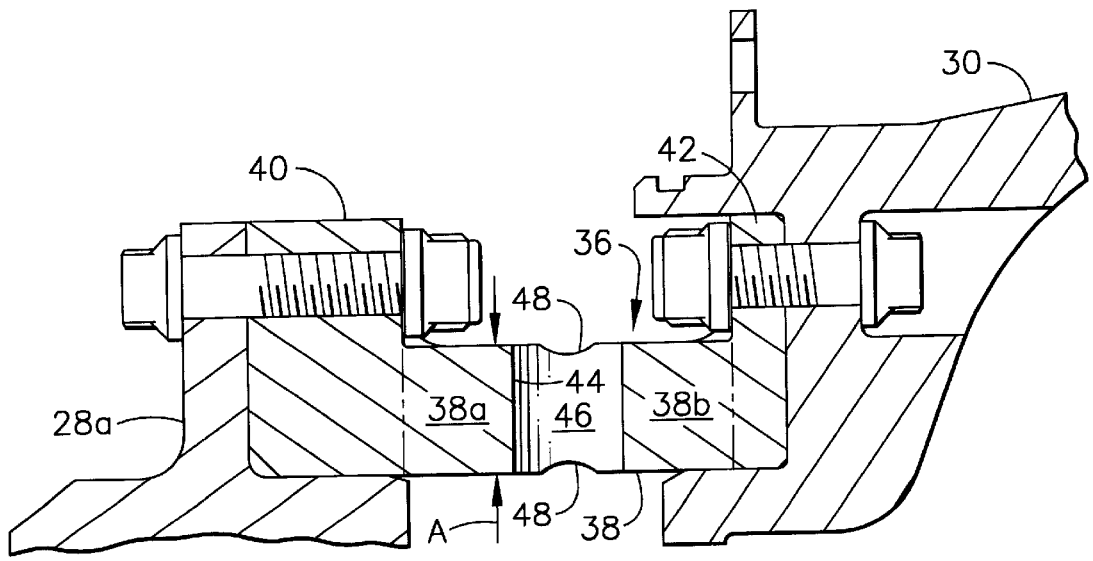
FIG. 4 is an enlarged sectional view of the fan decoupling fuse illustrated in FIG. 2.
Figure 5:
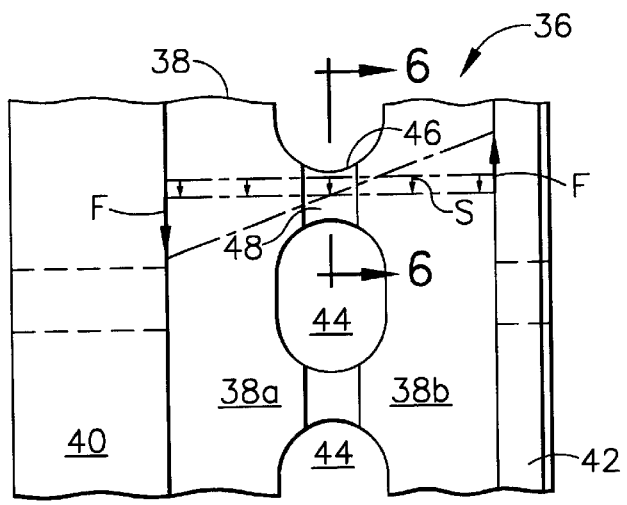
FIG. 5 is a radially inwardly facing view of a portion of the fan decoupling fuse illustrated in FIG. 3.

The decoupling fuse 36 is illustrated in more particularity in FIGS. 4 and 5. The fuse ring 38 includes a row of fuse holes 44 extending radially through the ring 38 and circumferentially spaced apart by intervening, axially extending fuse links or ligaments 46. The ligaments 46 are preferably sized and configured to fail under shear when carrying a predetermined abnormal radial load from the fan, such as that occurring during FOD.

For example, one of the fan blades may be bent or partially ejected during a FOD event for introducing the imbalance load F. A suitable value of the imbalance load F may be selected for each design application and used for sizing the fuse ligaments 46 so that they fail under shear as the imbalance loads are carried through the loadpath including the fan bearing 28, fuse 36, and bearing support 30. The fuse ring 38 illustrated in FIG. 4 is preferably cylindrical and includes a circumferentially continuous, annular forward section 38*a* at one end integrally joined to the forward flange 40. The ring also includes a circumferentially continuous, annular aft section 38*b* integrally joined to the aft flange 42. And, the forward and aft sections 38*a,b* are integrally joined together by a center section defined by the row of axially extending fuse ligaments 46 separated by the corresponding fuse holes 44.

The ring 38 including the forward and aft flanges 40,42 is preferably a one-piece or unitary component integrally including the forward and aft sections 38*a,b* and ligaments 46 extending axially therebetween. The ring forward and aft sections are preferably imperforate, with the center section therebetween being perforate with the fuse holes 44. And, the ring preferably has a substantially constant radial thickness A between the two end flanges, except as locally thinned in a preferred embodiment of the ligaments described hereinbelow.

The unitary, cylindrical construction of the fuse 36 illustrated in FIG. 4 may be formed from a conventional forging of high-strength metal and machined to the desired configuration illustrated. In this way, the fuse 36 itself defines a relatively rigid or stiff three-dimensional ring having substantial strength for carrying both radial bending and shear loads between the two opposite flanges thereof during operation. During normal operation, normal loads from the rotating fan are carried through the fuse 36 to the bearing support without life-limiting fatigue damage. Both radial bending loads and shear loads are readily carried through the cylindrical fuse 36.

However, during the FOD event in which the imbalance load F exceeds a predetermined value, the fuse ligaments 46 are designed to fail preferably only under shear stress for disconnecting the forward flange 40 and forward section 38a from the aft flange 42 and aft section 38b for decoupling the fan from the bearing support.

As shown in FIG. 5, the ligaments 46 are preferably located in the middle of the ring 38 generally in the center between the forward and aft sections 38a,b thereof for minimizing bending forces therein due to bending moments. Shown schematically in FIG. 5 is a bending force diagram in which the imbalance load F is reacted over the axial extent of the fuse ring 38 between the two end flanges 40,42. A corresponding constant shear force S diagram is also illustrated.

As the radially directed imbalance force is carried from the forward flange 40 to the aft flange 42, a reaction force in opposition thereto is generated which creates a corresponding bending moment therebetween. The corresponding bending forces change direction at an inflection point preferably located at the axial center of the ligaments 46 for eliminating bending stresses thereat while experiencing substantially only shear stress at the center of the ligament.

With this configuration, the ligaments 46 may be specifically sized and configured for failing primarily only under shear stress for effecting the desired fuse function. In this way minimum variability is obtained between the maximum load that the fuse is capable of transmitting before failure and the minimum load it is capable of carrying without life-limiting fatigue damage.

As illustrated in FIG. 5, the shape of the fuse holes 44 defines the corresponding side configuration of the intervening fuse ligaments 46. Preferably, the fuse holes 44 are arcuate or generally semi-circular on opposite sides of the corresponding ligaments 46 which correspondingly have center waists which are relatively narrow in the circumferential direction. For example, the axial configuration of the ligaments 46 is similar to the historical hour-glass. In this way, the individual ligaments have a narrow waist at which the shear loads generate concentrated stress for ensuring failure thereat under the abnormal imbalance load. The identically configured multiple ligaments and waists decrease variability of the loads required to cause the desired fuse failure around the circumference of the fuse.

As shown in FIG. 4, each of the ligaments 46 preferably includes at least one notch 48 at the corresponding waist thereof for additionally reducing cross sectional area locally thereat. The arcuate curvature of the fuse hole 44 in FIG. 5 introduces the narrow waist in the circumferential sides of the ligament, whereas the notches 48 illustrated in FIG. 4 introduce corresponding narrow waists in either the radially outer or inner surface of the ligament, or both.

In the preferred embodiment illustrated in FIG. 4, the notches 48 are arcuate, such as portions of circles, and disposed both in the radially outer and inner surfaces of each of the ligaments 46 so that the axial center of each ligament has a narrow waist in both the axial and radial directions.

In this way, precisely located stress concentrations may be intentionally introduced at the center of each ligament for ensuring shear failure thereat at shear levels corresponding with the predetermined abnormal imbalance load F. Stress concentrations are ordinarily not desired in load carrying elements, and are normally avoided in good engineering practice.

However, by specifically introducing local stress concentrations solely at the center of the corresponding ligaments 46, specific and precise shear failure may be limited to this location without otherwise compromising the substantial load carrying capability of the fuse 36. As indicated above, the fuse 36 has a relatively constant radial thickness and is relatively rigid and stiff for carrying bending and shear loads during normal operation.

The stress concentration introduced at the middle of the ligament 46 corresponds with the low bending forces carried at the corresponding inflection point thereof, and therefore does not compromise bending load carrying capability of the fuse, with the stress concentration having little or no effect on bending forces. The stress concentration is primarily limited to the shear loads and ensures intended failure at a specific shear force substantially above normal shear forces carried during normal operation of the fuse.

As shown in FIG. 5, the fuse holes 44 are preferably oval in the circumferential direction circumferentially between adjacent ligaments 46. The oval holes in this orientation limit the axial length of the individual ligaments 46 while maximizing the axial length of the ring forward and aft sections 38a,b. This increases the overall stiffness and strength of the fuse while locally introducing the desired fuse ligaments 46.

In the preferred embodiment illustrated in FIG. 5, the oval fuse holes 44 have semi-circular circumferentially opposite ends which define the circumferential sides of the ligaments 46, and circumferentially straight axially opposite ends which collectively define a generally oblong or racetrack configuration. The racetrack holes 44 introduce axially shorter ligaments than for circular fuse holes, with the same cross sectional area available for carrying shear loads.

However, the axially shorter ligaments for the racetrack holes substantially increase shear stiffness, in addition to increasing bending stiffness of the fuse. The resulting fuse maintains substantial stiffness and strength for carrying loads during normal operation without failure or life-limiting fatigue damage, while ensuring a more precise shear failure when intended during the abnormal FOD event.

In this way, maximum uncoupling of bending loads and shear loads occurs at the narrow waist of each ligament for optimizing mechanical strength for normal operation while permitting intended shear failure for the predetermined abnormal imbalance load.

The cross sectional configuration of each ligament 46 may be chosen as desired for ensuring shear failure under abnormal loading, while maximizing fuse strength during normal operation and normal load carrying capability, with substantial fatigue strength. The cross sectional profile of the fuse ligaments should be symmetrical irrespective of the rotary position of the ligament around the circumference of the annular fuse.

As illustrated in FIGS. 1 and 3, the imbalance load F necessarily rotates around the engine centerline axis until the fan comes to a stop. Since the ruse 36 is a three-dimensional ring, maximum shear loads are generated in the ring 90° from the direction of the rotating imbalance load F. For example, when the imbalance load F is directed radially downwardly at about the 6 o'clock position illustrated in FIG. 3, the maximum shear loads occur at the 3 o'clock and 9 o'clock positions on the sides of the fuse 36.

This is illustrated schematically in FIG. 5 where the radial imbalance load F introduces a bending moment between the two supporting flanges 40,42, with the bending loads having an inflection point of zero bending force at the center of the ligaments 46. However, the shear loads S have a constant value across the axial direction of the fuse including the ligaments 46.

Figure 6:
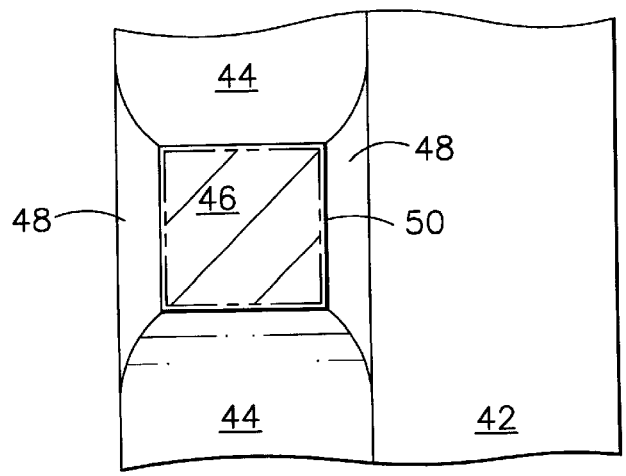
FIG. 6 is a partly sectional, elevational view through one of the fuse ligaments of the fuse illustrated in FIG. 5 and taken along line 6—6.

As shown in FIG. 6, each of the ligaments 46 preferably has a substantially square cross section at the middle of the notches and side waists for ensuring uniformity of application of the shear loads as the imbalance force rotates circumferentially around the fuse. In practice, the fuse ligaments 46 located 90° from the direction of the rotating imbalance force will first fail, and then in a zipper-like fashion, the subsequent ligaments will fail in sequence following the direction of rotation of the rotating imbalance force until all the ligaments have failed and sever the forward and aft portions of the fuse following the imbalance event.

Accordingly, fuse ligaments of rectangular configuration are not preferred in view of their increased shear strength along the major axis of the rectangle which would undesirably increase the nonuniformity of shear failure load required for severing the individual ligaments in turn. However, circular profile ligaments are desirable but are difficult to manufacture in the machined fabrication of an initially forged fuse ring. Alternatively, casting of the fuse ring with circular or other intricately shaped fuse ligaments may be practical where design loads permit.

A particular advantage of the fuse 36 illustrated in FIG. 2 is its compact size and relative simplicity in the form of a cylindrical ring having a common outer diameter, and a common inner diameter. The fuse ring therefore requires little radial space for its introduction since it extends primarily in the axial direction.

Accordingly, the cylindrical fuse 36 has particular advantage in combination with the bearing support 30 in the form of a conical housing which increases in diameter aft from the fuse 36. The bearing support 30 has increased stiffness and strength due to its conical configuration, but correspondingly reduces the available radial envelope in which to mount both the bearing 28 and the fuse 36 at its forward end.

Since the fuse 36 extends primarily only in the axial direction at a common, nominal diameter, it may be readily fixedly attached to the forward end of the conical bearing support 30, with the forward end of the fuse being fixedly joined to the outer race of the bearing. In this configuration, the fuse 36 requires no increase in radial space for its introduction in combination with the conical bearing support 30, and may therefore be used in retrofit applications with minimal design changes.

For example, one turbofan aircraft gas turbine engine used in commercial service in this country for many years includes a cylindrical forward housing or ring for joining a fan bearing and conical bearing support similar to those illustrated in FIG. 2. This forward housing, like the fuse 36 illustrated in FIG. 2, includes forward and aft mounting flanges with a constant thickness cylindrical ring therebetween. However, this forward housing includes a row of circular radial holes therethrough substantially spaced apart from each other for providing passages for air and oil during operation. The circular holes have diameters of about 19 mm and a pitch spacing of about 5 cm. This forward housing is specifically sized and configured for carrying normal as well as abnormal bearing loads without failure. And, the entire loadpath including this forward housing is also sized for carrying the normal and abnormal loads, which requires sufficient strength and corresponding increase in weight therefor.

In contrast, this forward bearing housing may be readily retrofitted by the specifically configured fuse of the present invention for introducing intentional fuse failure for decoupling the fan from the bearing support for many of the advantages described above. The number of holes would be suitably increased, and the holes would be sized and configured for forming axial ligaments correspondingly sized and configured for intentional fuse-failure under the desired shear load.

In the preferred embodiment illustrated in FIG. 3, the circumferential pitch of the fuse holes 44 is less than twice the circumferential length thereof, and the resulting fuse ligament 46 is circumferentially narrower than the fuse holes. Collectively, the numerous, closely spaced together ligaments effect substantial stiffness and strength in the fuse for carrying all normal loads without accumulating fatigue damage. However, the rotating unbalance load during abnormal operation initiates shear failure in one or more local fuse ligaments which then fail in a domino sequence.

In derivative designs of the retrofit engine, the entire loadpath for the forward bearing may be redesigned for the reduced strength associated with the fuse introduction to correspondingly decrease the overall weight of the engine while maintaining acceptable operation during the abnormal operation.

As indicated above, the unitary fuse 36 is relatively simple in configuration and compact and uses multiple, evenly spaced ligaments specifically designed to fail in shear at a given design load. The ring is axially short and structurally stiff at both ends and ensures circumferentially even distribution of loading between ligaments when the radial imbalance load is applied to the forward end of the fuse while the aft end of the fuse is supported by the bearing support.

The specifically configured ligament waists have significantly smaller cross sectional area than axially opposite sections thereof in which the peak shear stress is located for ensuring the location of expected shear failure for reducing variability in shear failure loads.

The ligament cross sections are preferably square, or may be round, but may also have any geometric shape which allows the peak section stress to remain constant as the shear load direction is rotated. This feature allows for nearly equivalent peak stresses in each ligament circumferentially around the ring thereby minimizing redistribution of loads once the material yield stress is reached at the peak stress location. This also minimizes the load variation from the fatigue life point to the ultimate failure point of the ring.

The ligaments and their preferred waists are centrally located axially for ensuring that the loads carried therethrough are substantially shear loads only, with little or no bending loads. The ligaments carry the imbalance load in shear resulting in peak stress occurring in the center of the ligament cross section, and thusly maximizing the fatigue capability of the section for a given load capability. This also minimizes the load variation from the fatigue life point to the ultimate failure point of the ring.

To further increase fatigue life of the fuse, the individual ligaments 46 illustrated in FIG. 6 may be conventionally treated for plastically compressing the surface layer around each ligament to introduce a residual compressive stress surface layer 50. Conventional shot peening or laser shock peening may be used to advantage to introduce the compressive surface layer 50 for enhancing fatigue life of the fuse.

Although the fuse 36 is disclosed above with respect to a preferred embodiment as a separate, unitary cylindrical ring fixedly joined to the bearing outer race at one end and fixedly joined to the forward end of the bearing support 30, the fuse may be integrally formed in either of those two elements.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by letters patent of the united

States is the invention as defined and differentiated in the following claims in which we claim:

1. A fan decoupling fuse comprising:

a ring having a row of fuse holes circumferentially spaced apart from each other by fuse ligaments sized to fail under shear when carrying a predetermined abnormal radial load from said fan;

said ring being cylindrical and including an annular forward section axially joined to an annular aft section by said ligaments for carrying bending and shear loads therebetween; and said ligaments are located in the middle between said forward and aft sections for minimizing bending forces in said ligaments.

2. A fuse according to claim 1 wherein said ring is a unitary component integrally including said forward and aft sections and ligaments therebetween, and said forward and aft sections are imperforate.

3. A fuse according to claim 1 wherein said holes are arcuate at said ligaments, and said ligaments correspondingly have narrow waists.

4. A fuse according to claim 3 wherein said ligaments include corresponding notches at said waists for reducing cross sectional area thereat.

5. A fuse according to claim 4 wherein said notches are arcuate and disposed in radially outer and inner surfaces of said ligaments.

6. A fuse according to claim 4 wherein said fuse holes are oval circumferentially between adjacent said ligaments.

7. A fuse according to claim 6 wherein said oval fuse holes have semi-circular circumferentially opposite ends, and circumferentially straight axially opposite ends.

8. A fuse according to claim 4 wherein said ligaments have substantially square cross sections at the middle of said notches and waists.

9. A fuse according to claim 4 further comprising an annular forward flange integrally joined to said forward section, and an annular aft flange integrally joined to said aft section for mounting said fuse between a bearing and bearing support.

10. A fuse according to claim 9 in combination with said bearing fixedly supported by said forward flange, said bearing support being fixedly joined to said aft flange, and said fan being rotatably supported by said bearing.

11. A combination according to claim 10 wherein said bearing support is conical and increases in diameter aft from said fuse.

12. A fan decoupling fuse comprising:

a cylindrical ring including an imperforate forward section, an imperforate aft section, and a center section therebetween defined by a row of fuse holes circumferentially spaced apart by corresponding axial fuse ligaments sized to fail under shear, said ligaments being located in the middle between said forward and aft sections for minimizing bending forces in said ligaments;

an annular forward flange integrally joined to said forward section; and an annular aft flange integrally joined to said aft section in a discrete and unitary configuration with said ring and forward flange.

13. A fuse according to claim 12 wherein said holes are arcuate at said ligaments, and said ligaments correspondingly have narrow waists.

14. A fuse according to claim 13 wherein said ligaments include corresponding notches at said waists for reducing cross sectional area thereat.

15. A fuse according to claim 14 wherein:

said notches are arcuate and disposed in radially outer and inner surfaces of said ligaments; and said fuse holes are oval circumferentially between adjacent ligaments, and have semi-circular circumferentially opposite ends, and circumferentially straight axially opposite ends.

16. A fuse according to claim 15 wherein said ligaments have substantially square cross sections at the middle of said notches and waists.

17. A fan decoupler system comprising:

a fan attached to a fan shaft;

a bearing rotatably supporting said fan shaft;

a fan decoupling fuse supporting said bearing, and including a unitary ring having a row of fuse holes circumferentially spaced apart from each other by axial fuse ligaments sized to fail under shear due to a predetermined abnormal load from said fan, said fuse holes being oval circumferentially between adjacent ligaments, and having semi-circular circumferentially opposite ends, and circumferentially straight axially opposite ends; and a bearing support fixedly joined to said fuse for supporting said bearing and fan shaft.

18. A system according to claim 17 wherein said ligaments have correspondingly narrow waists including notches in radially outer and inner surfaces thereof for reducing cross sectional area thereat.

19. A system according to claim 18 wherein said ring is cylindrical, and said fuse further includes an annular forward radial flange integrally joined to said ring at one end thereof, and an annular aft radial flange integrally joined to said ring at an opposite end thereof for mounting said fuse between said bearing and bearing support.

20. A system according to claim 19 wherein said ligaments have substantially square cross sections at the middle of said notches and waists, and said waists are centered axially in said ring.

* * * * *